(12) United States Patent
Song et al.

(10) Patent No.: US 10,668,938 B1
(45) Date of Patent: Jun. 2, 2020

(54) FOLDING HANDCART

(71) Applicants: Jae Ho Song, Yongin-si (KR); Won Seok Song, Yongin-si (KR); Bo Kyoung Song, Suwon-si (KR)

(72) Inventors: Jae Ho Song, Yongin-si (KR); Won Seok Song, Yongin-si (KR); Bo Kyoung Song, Suwon-si (KR)

( * ) Notice: Subject to any disclaimer, the term of this patent is extended or adjusted under 35 U.S.C. 154(b) by 0 days.

(21) Appl. No.: 16/268,812

(22) Filed: Feb. 6, 2019

(30) Foreign Application Priority Data

Dec. 27, 2018 (KR) .................. 10-2018-0170477

(51) Int. Cl.
*B62B 1/12* (2006.01)
*B62B 1/16* (2006.01)
*B62B 5/06* (2006.01)

(52) U.S. Cl.
CPC .............. *B62B 1/12* (2013.01); *B62B 1/16* (2013.01); *B62B 5/065* (2013.01)

(58) Field of Classification Search
CPC .... B62B 1/12; B62B 1/14; B62B 1/16; B62B 5/065
See application file for complete search history.

(56) References Cited

U.S. PATENT DOCUMENTS

| 2,782,047 | A | * | 2/1957 | Moran | B62B 1/12 |
| | | | | | 280/654 |
| 2,832,606 | A | * | 4/1958 | Patterson | B62B 1/12 |
| | | | | | 280/37 |
| 4,917,401 | A | * | 4/1990 | Iwaki | B62B 1/125 |
| | | | | | 280/47.29 |
| 5,213,360 | A | * | 5/1993 | Lin | A47D 1/02 |
| | | | | | 280/648 |
| 6,267,393 | B1 | * | 7/2001 | Mengrone | A45C 5/14 |
| | | | | | 280/30 |
| 8,602,444 | B2 | * | 12/2013 | Chang | B62B 1/12 |
| | | | | | 280/651 |
| 9,233,700 | B1 | * | 1/2016 | Elden | B62B 1/12 |
| 2004/0201186 | A1 | * | 10/2004 | Tornabene | B62B 1/002 |
| | | | | | 280/30 |
| 2005/0006877 | A1 | * | 1/2005 | Kachkovsky | B62B 3/027 |
| | | | | | 280/641 |
| 2011/0291390 | A1 | * | 12/2011 | Benimeli | A45C 5/146 |
| | | | | | 280/655 |
| 2015/0123363 | A1 | * | 5/2015 | Tsai | B62B 1/042 |
| | | | | | 280/47.29 |

(Continued)

FOREIGN PATENT DOCUMENTS

KR  19990033105 U  8/1999

*Primary Examiner* — Brian L Swenson
(74) *Attorney, Agent, or Firm* — Egbert, McDaniel & Swartz, PLLC

(57) ABSTRACT

A folding handcart includes: a main body provided with at least one wheel unit for moving at a lower portion thereof and provided with a supporter configured to extend vertically from the lower portion thereof; and a loading plate connected to the supporter of the main body through a hinge unit, folded while being rotated toward the main body by the hinge unit, and stowing an article or a folding box, wherein, when the loading plate is folded while being rotated toward the main body, a predetermined stowing space is provided between the main body and the loading plate in accordance with an area of the supporter such that the folding box is folded and stowed therein.

6 Claims, 10 Drawing Sheets

(56) References Cited

U.S. PATENT DOCUMENTS

2015/0203136 A1\* 7/2015 Wang ...................... B62B 1/045
  280/47.29
2016/0075358 A1\* 3/2016 Simon ....................... B62B 1/12
  280/40

\* cited by examiner

FOLDING HANDCART

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a folding handcart.

2. Description of Related Art Including Information Disclosed Under 37 CFR 1.97 and 37 CFR 1.98

In general, a handcart is a carrying device that enables moving an article, a box, or the like easily by use of a wheel.

Especially, among various kinds of handcarts, a two-wheeled handcart includes: a main body vertically disposed with respect to the ground and having a handle at an upper end thereof; and a loading plate protruding from a lower portion of the main body in a direction perpendicular to the main body to stow an article, or the like, wherein a lower portion of the main body is provided with wheel parts.

In the case of the conventional two-wheeled handcart constructed as described above, after an article or box is placed on the loading plate, a handcart handle is pulled backward to incline the upper end of the main body rearward such that the center of gravity of the main body and the article or box is positioned over the wheel parts. Then, a user pulls the cart using the handle to move the article or box stowed on the loading plate to a desired place by rotation of wheels. In addition, the cart is configured such that, when the cart is not used for stowing of an article or box, the loading plate is folded toward the main body by a hinge for storing or convenient transport.

However, the conventional two-wheeled handcart has a problem in that it is impossible to stow a folded box or the like, which can store an article, between the loading plate and the main body while the loading plate is folded toward the main body, thereby lowering ease of use.

DOCUMENTS OF RELATED ART (Patent Document 0001) Korean Utility Model Application Publication No. 20-1999-0033105, published on Aug. 5, 1999.

BRIEF SUMMARY OF THE INVENTION

Accordingly, the present invention has been made keeping in mind the above problems occurring in the related art, and an objective of the present invention is to provide a folding handcart in which an article storage box is folded and stowed between a loading plate and a main body while the loading plate is folded toward the main body such that ease of use is excellent and the cart can stably bear loads in a state where the loading plate is unfolded in a direction perpendicular to the main body.

In order to achieve the above objective, according to one aspect of the present invention, there is provided a folding handcart including: a main body provided with at least one wheel unit for moving at a lower portion thereof and provided with a supporter configured to extend vertically from the lower portion thereof; and a loading plate connected to the supporter of the main body through a hinge unit, folded while being rotated toward the main body by the hinge unit, and stowing an article or a folding box, wherein, when the loading plate is folded while being rotated toward the main body, a predetermined stowing space is provided between the main body and the loading plate in accordance with an area of the supporter such that the folding box is folded and stowed therein.

A connecting part may be provided on an upper portion of the main body to hold the folding box. When the folding box is folded in a state where the folding box is stowed on the folding handcart through the connecting part, the folding box may be disposed on an upper surface of the supporter and placed in the stowing space.

A spring unit may be provided on a lower portion of the main body to provide an elastic force in a downward direction of the hinge unit.

The hinge unit may be provided with a hinge step to transfer the elastic force to the hinge unit, which is provided by the spring unit when the loading plate is folded toward the main body.

The spring part may include: a spring providing the elastic force to the hinge step; and a spring case accommodating the spring and being inserted into a spring case insertion recess provided at the lower side of the main body.

A first support portion may be provided at a first side of the loading plate, the first support portion being in contact with the ground and supporting the loading plate.

A second support portion may be provided on a second side of the loading plate, the second support portion being in contact with the ground and supporting the hinge unit. The second support portion may be configured such that, when the loading plate is unfolded in a direction perpendicular to the main body, a lower end thereof is positioned on or below a virtual straight line connecting lower ends of the first support portion and the wheel unit.

A main body support portion may be provided at a lower portion of the main body, the main body support portion being in contact with the ground and supporting the main body. The main body support portion may be configured such that, when the loading plate is unfolded in a direction perpendicular to the main body, a lower end thereof is positioned on or below a virtual straight line connecting lower ends of the first support portion and the wheel unit.

When the loading plate is folded and the folding handcart is in a stopped state, the lower end of the wheel unit and the lower end of the main body support portion or a lower end of the hinge unit may be in contact with the ground such that the main body and the loading plate are supported thereby.

Here, the first support portion and the second support portion may be integrally configured with the loading plate by sharing the same bottom surface of the loading plate.

Also, the main body support portion may be integrally configured with the main body by sharing the same bottom surface of the main body.

According to the present invention, it is possible to stow an article storage box that is in a folded state between a loading plate and a main body while the loading plate is folded toward the main body whereby ease of use is excellent. In addition, it is possible to stably bear loads while the loading plate is unfolded in a direction perpendicular to the main body. Accordingly, it is possible to carry a folding handcart while the folding box is stowed therein, thereby improving convenience in use.

BRIEF DESCRIPTION OF THE SEVERAL VIEWS OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

In the following description, it is to be noted that, when the functions of conventional elements and the detailed description of elements related with the present invention may make the gist of the present invention unclear, a detailed description of those elements will be omitted. In addition, it will be understood that, although the terms "first", "second", etc. may be used herein to describe various elements, these elements should not be limited by these terms. These terms are only used to distinguish one element from another element.

Furthermore, all terms or words used in the description and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Therefore, the description proposed herein is just a preferable example for the purpose of illustrations only, and is not intended to limit the scope of the disclosure, so it should be understood that other equivalents and modifications could be made thereto without departing from the spirit and scope of the disclosure.

Hereinbelow, embodiments of the present invention will be described in detail. However, descriptions of known functions and configurations which have been deemed to obfuscate the gist of the present invention will be omitted below.

Figure 1:
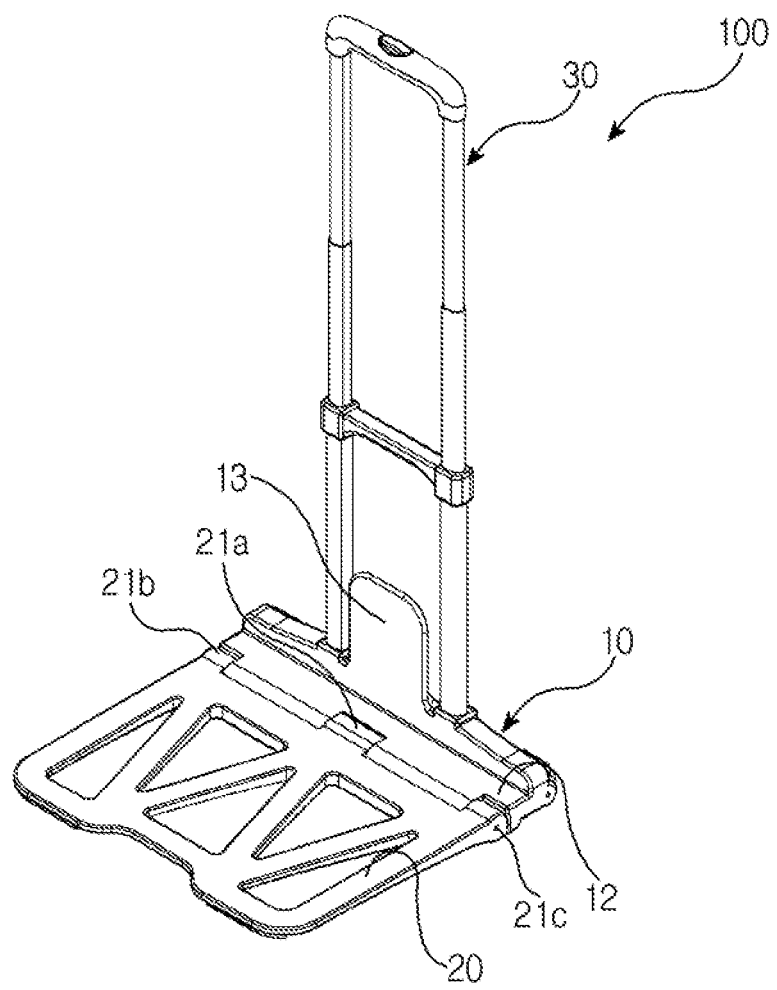
FIGS. 1 and 2 are perspective views each illustrating a folding handcart according to an embodiment of the present invention.
Figure 2:
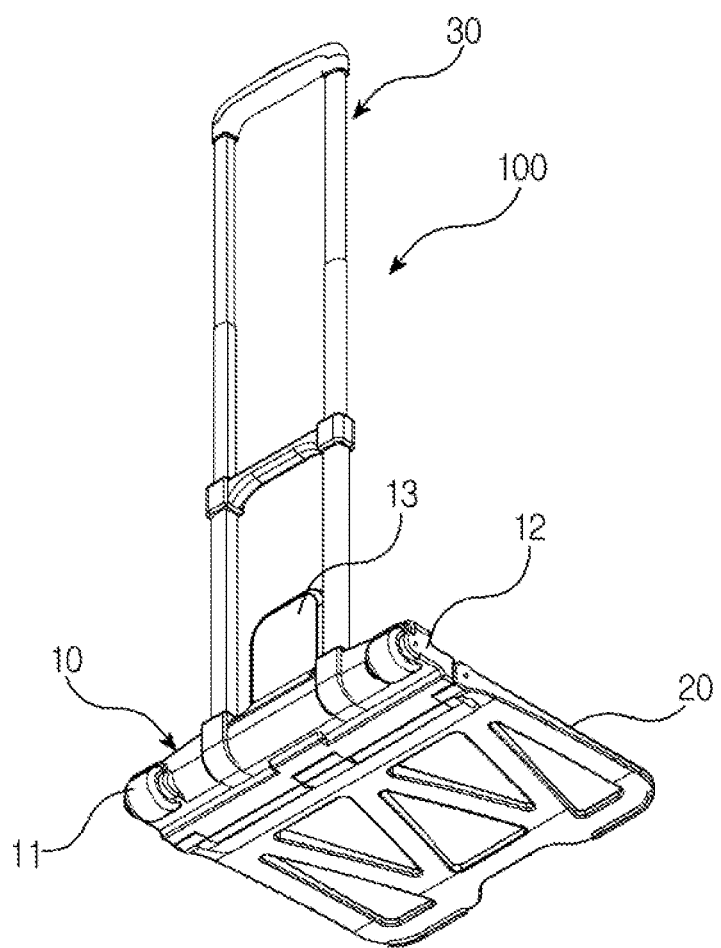
Figure 3A:
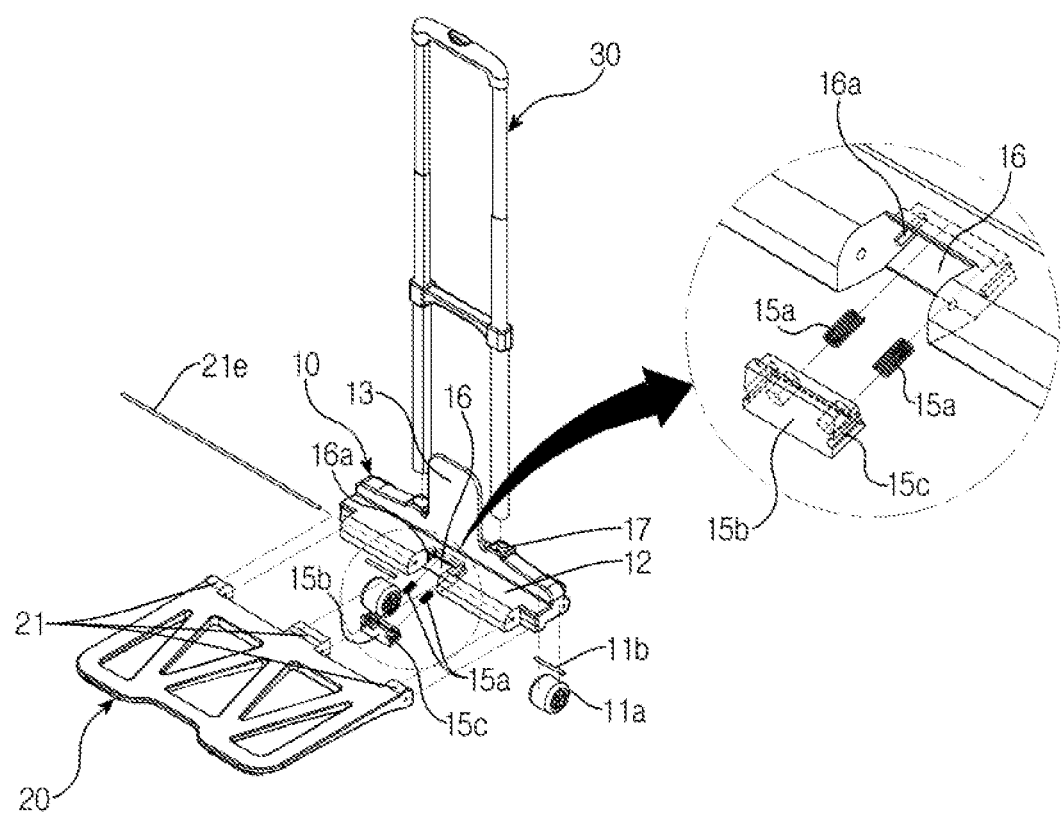
FIGS. 3A and 3B are exploded perspective views each illustrating the folding handcart according to embodiments of the present invention.
Figure 3B:
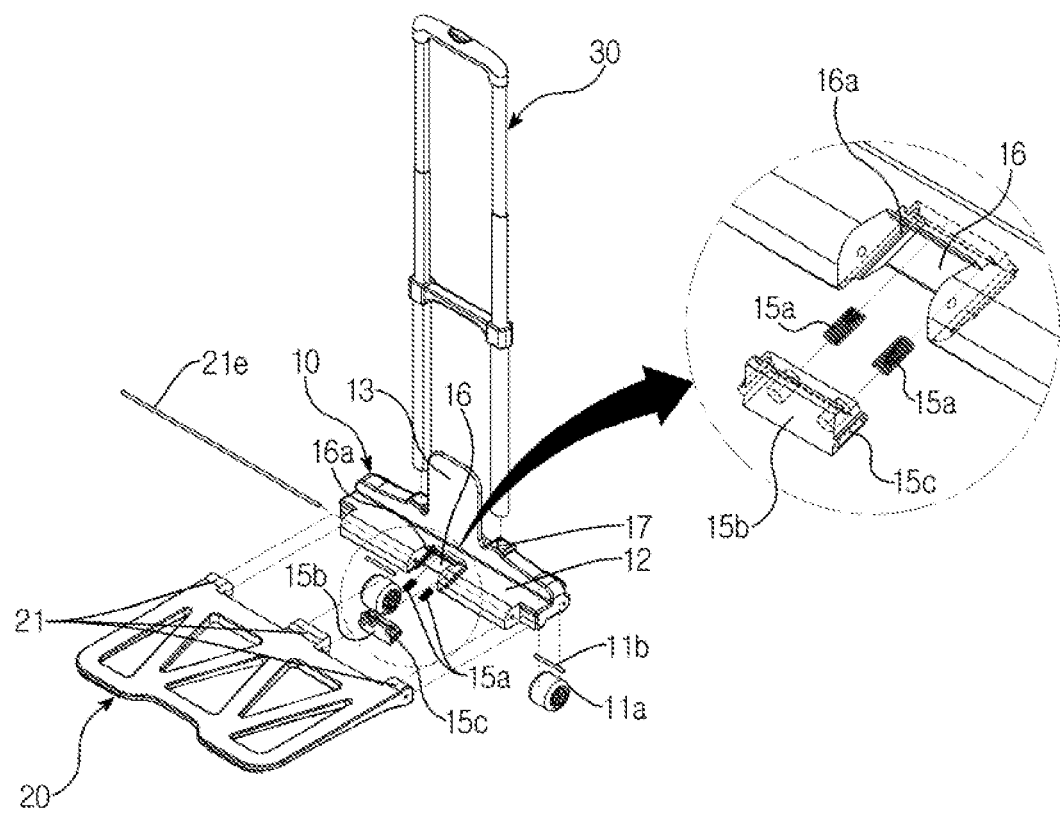
Figure 4:
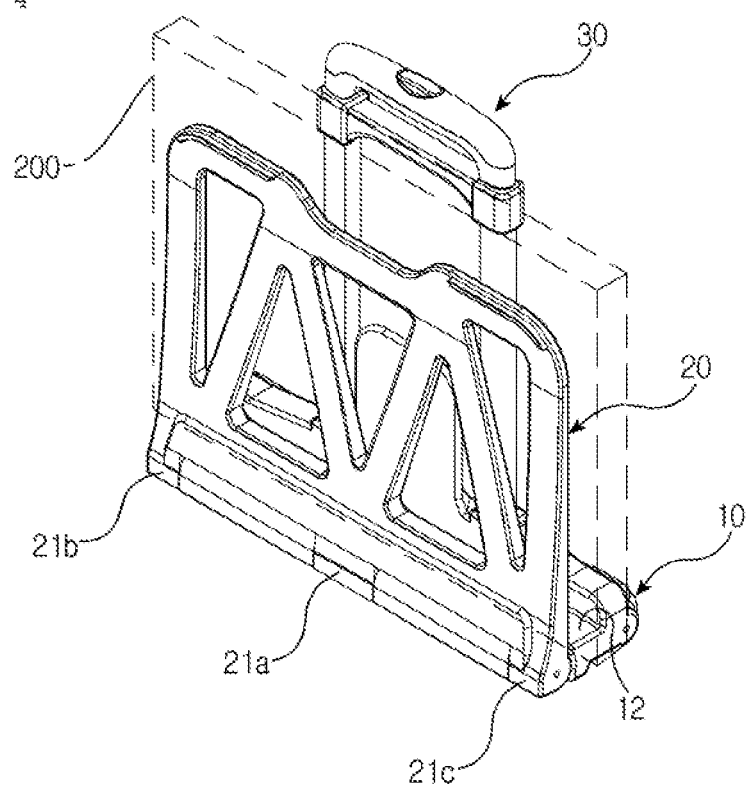
FIGS. 4 and 5 illustrate a folding box and the folding handcart according to the embodiment of the present invention in a folded state.
Figure 5:
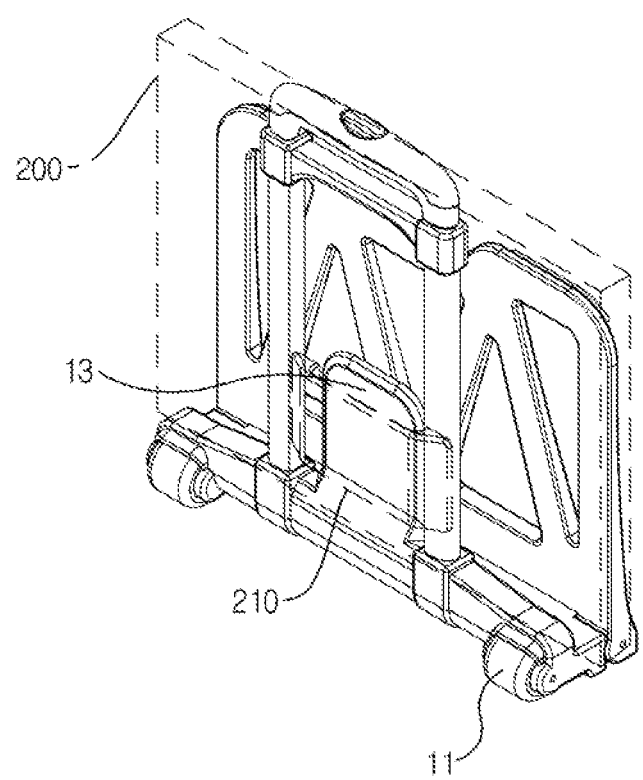
Figure 6:
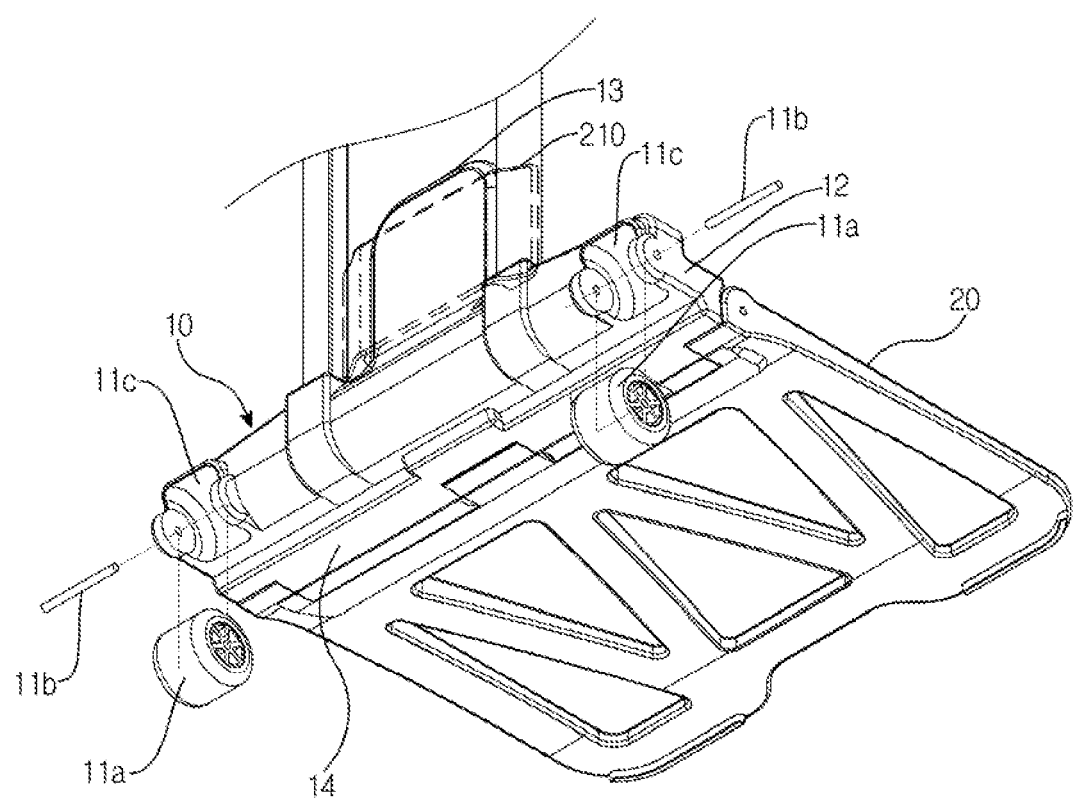
FIG. 6 is a bottom perspective view illustrating the folding handcart according to the embodiment of the present invention.
Figure 7:
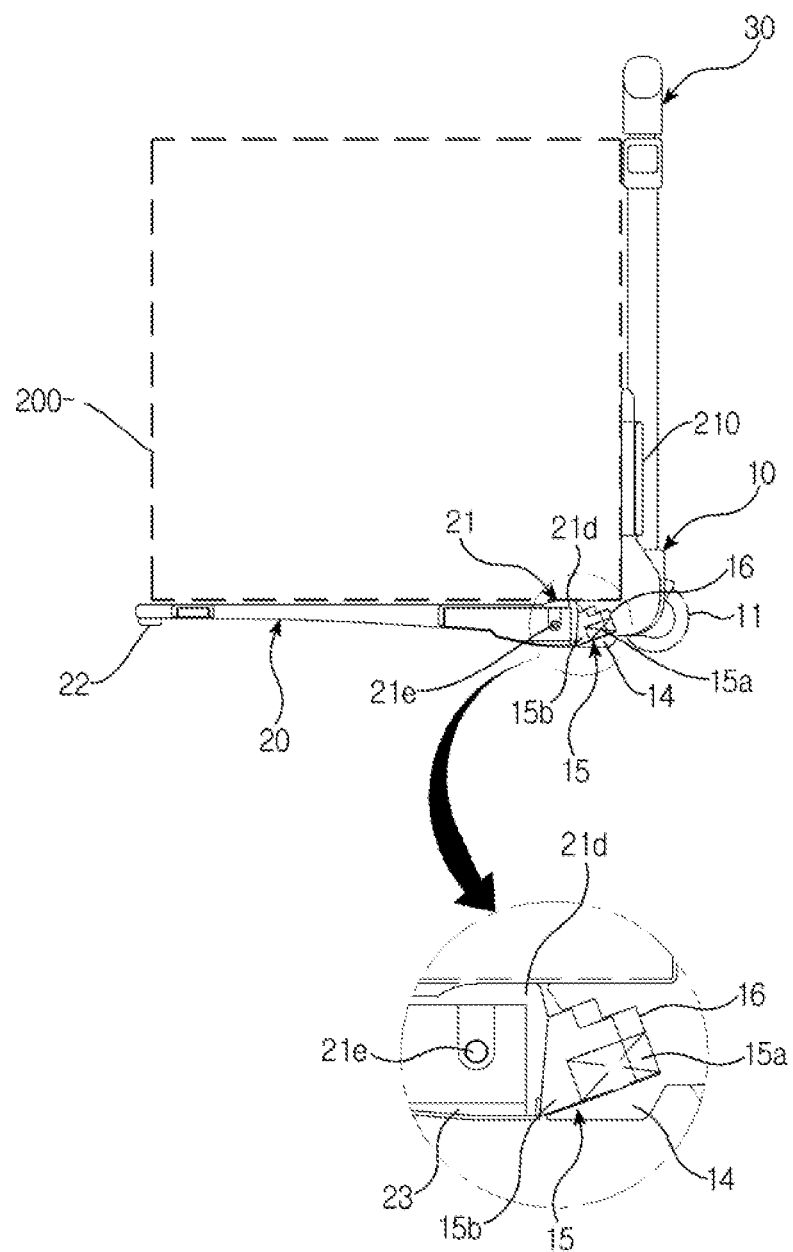
FIGS. 7 to 9 illustrate an operation of the folding handcart according to the embodiment of the present invention.
Figure 8:
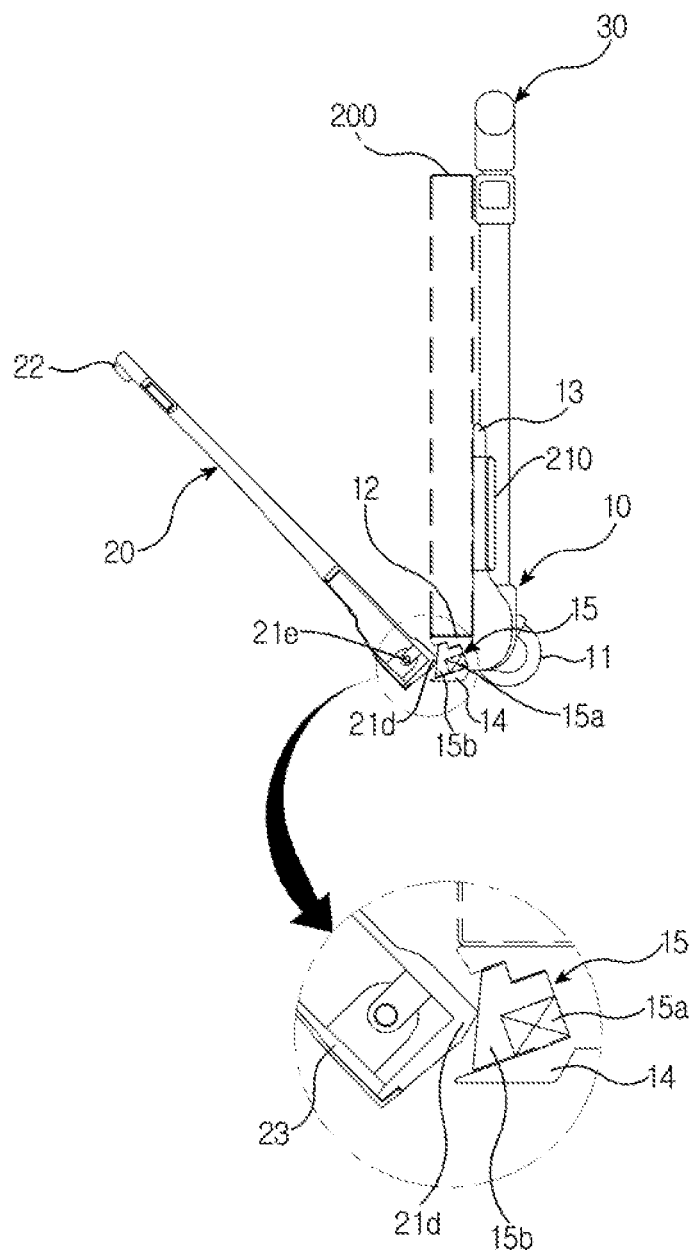
Figure 9:
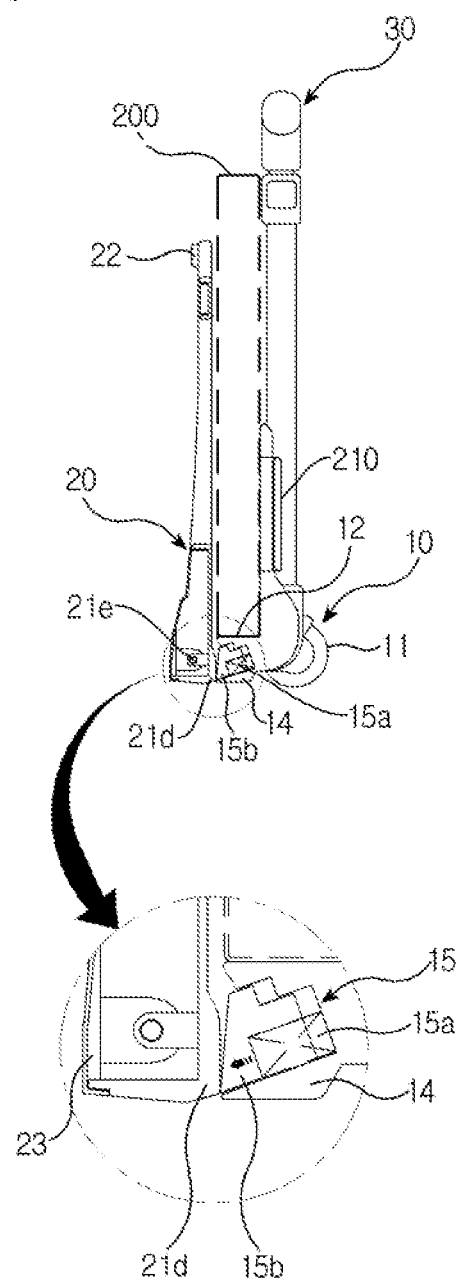

FIGS. 1 and 2 are perspective views each illustrating a folding handcart according to an embodiment of the present invention; FIGS. 3A and 3B are exploded perspective views each illustrating the folding handcart according to embodiments of the present invention; FIGS. 4 and 5 illustrate a folding box and the folding handcart according to the embodiment of the present invention in a folded state; FIG. 6 is a bottom perspective view illustrating the folding handcart according to the embodiment of the present invention; and FIGS. 7 to 9 illustrate an operation of the folding handcart according to the embodiment of the present invention.

In an embodiment of the present invention, a folding handcart 100 includes: a main body 10 provided with at least one wheel unit 11 for moving at a lower portion thereof and provided with a supporter 12 configured to extend vertically from the lower portion thereof; and a loading plate 20 connected to the supporter 12 of the main body 10 through a hinge unit 21, folded while being rotated toward the main body 10 by the hinge unit 21, and stowing an article or a folding box 200, wherein, when the loading plate 20 is folded while being rotated toward the main body 10, a predetermined stowing space is provided between the main body 10 and the loading plate 20 in accordance with an area of the supporter 12 such that the folding box 200 is folded and stowed therein.

The body 10 may be made of a hard synthetic resin or a metal. As illustrated in FIG. 2, the main body 10 is provided with at least one wheel unit 11 for moving at the lower portion thereof. In addition, the main body 10 may be provided with the supporter 12 configured to extend vertically from the bottom such that a stowing space is provided between the main body 10 and the loading plate 20 when the loading plate 20 is folded toward the main body 10.

As illustrated in FIG. 1, the loading plate 20 may be made of a hard synthetic resin or a metal as the main body 10 in order to safely carry an article or the folding box 200 on an upper surface thereof. The loading plate 20 is provided with the hinge unit 21 such that the loading plate 20 is connected to the supporter 12 of the main body 10 through the hinge unit 21. Therefore, the loading plate 20 is foldable by about 90 degrees toward the main body 10 through the hinge unit 21, and conversely, unfoldable in the perpendicular direction with respect to the main body 10.

Meanwhile, the folding box 200 has a space where an article is stored and may be configured to be folded inward.

In addition, as illustrated in FIGS. 4 and 5, in the embodiment of the present invention, the folding handcart 100 is configured such that a connecting part 13 is provided on an upper portion of the main body 10 to hold the folding box 200. When the folding box 200 is folded in a state where the folding box 200 is stowed on the folding handcart 100 through the connecting part 13, the folding box 200 is disposed on the upper surface of the supporter 12 and placed in the stowing space. Here, the folding box 200 may be provided with a connection holder 210. That is, it is possible to stow the folding box 200 on the folding handcart 100 of the present invention through the engagement of the connecting part 13 and the connection holder 210 provided on the folding box 200. Accordingly, the folding box 200 folded in the stowing space between the main body 10 and the loading plate 20 is stably disposed when the loading plate 20 is folded toward the main body 10.

Referring to FIG. 6, the wheel unit 11 may include at least one wheel 11a and a wheel shaft 11b inserted into the wheel 11a to rotate the wheel 11a. The wheel 11a and the wheel shaft 11b are inserted into a wheel insertion recess 11c provided at the lower portion of the main body 10 such that the wheel 11a can rotate to move the folding handcart 100.

In the embodiment of the present invention, the folding handcart 100 may be configured such that a spring unit 15 is provided at the lower portion of the main body 10 to provide an elastic force in a downward direction of the hinge unit 21.

In addition, in the embodiment of the present invention, the folding handcart 100 may be configured such that the hinge unit 21 is provided with a hinge step 21d to transfer the elastic force to the hinge unit 21, which is provided by the spring unit 15 when the hinge unit 20 is folded toward the main body 10.

Furthermore, in the embodiment of the present invention, the folding handcart 100 may be configured such that the hinge unit 21 includes: a central hinge 21a connecting the main body 10 and a central portion of the loading plate 20; a first hinge 21b and a second hinge 21c connecting the main body 10 and the loading plate 20 at opposite sides of the central hinge 21a; and a hinge shaft 21e connected to the insides of the central hinge 21a, the first hinge 21b, and the second hinge 21c such that the central hinge 21a, the first hinge 21b, and the second hinge 21c are rotatable.

Accordingly, the hinge step 21d is configured to surround the central hinge 21a and transfers the elastic force to the central hinge 21a, which is provided by the spring unit 15.

Referring to FIG. 3A, in embodiments of the present invention, the folding handcart 100 may be configured such that the spring unit 15 includes: a spring 15a providing an elastic force to the hinge step 21d; and a spring case 15b accommodating the spring 15a and being inserted into a spring case insertion recess 16 provided at a lower side of the main body 10.

Here, the spring case insertion recess 16 into which the spring case 15b is inserted may be configured to be inclined downward of the main body 10. Spring case rails 15c may be configured on opposite sides of the spring case 15b such that the spring case 15b inclinedly moves in the spring case insertion recess 16 along insertion recess guide rails 16a configured protruding from opposed inner sides of the spring case insertion recess 16.

Accordingly, when the loading plate 20 is folded toward the main body 10, the spring case 15b moves to a lower side of the hinge step 21d inside of the spring case insertion recess 16 along the insertion recess guide rail 16a by the elastic force of the spring 15a such that the elastic force of the spring 15a can be easily transferred to the lower side of the hinge step 21d. That is, referring to FIG. 9, when the loading plate 20 is folded toward the main body 10, it is possible to prevent the loading plate 20 from unfolding in the perpendicular direction with respect to the main body 10 due to the elastic force transferred in the lower side of the hinge step 21d. Therefore, a user can stably carry the folding handcart 100.

In addition, referring to FIG. 3B, according to the present invention, the insertion recess guide rails 16a configured on opposed sides of the spring case insertion recess 16 may be provided in a furrow shape inwardly recessed. In this case, it is preferable that the spring case rails 15c provided on the spring case 15b are provided in a form of protrusions protruding outward to correspond to the insertion recess guide rails 16a.

In the embodiment of the present invention, the folding handcart 100 may be configured such that a first support portion 22 is provided at a first side of the loading plate 20, the first support portion 22 being in contact with the ground and supporting the loading plate 20. Accordingly, the first support portion 22 is capable of stably supporting the loading plate 20 in contact with the ground when the loading plate 20 is unfolded in the direction perpendicular to the main body 10.

The folding handcart 100 of the present invention may be provided with an additional structure for supporting a lower portion of the main body 10 or a lower portion of the hinge unit 21 in order to prevent the loading plate 20 from being folded toward the main body 10 while the hinge unit 21 is in contact with the ground when the loading plate 20 is unfolded in the direction perpendicular to the main body 10. This structure will be described in detail below.

In the folding handcart 100 according to the first embodiment of the present invention, a second support portion 23 is provided on the lower portion of the hinge unit 21 at a second side of the loading plate 20, the second support portion 23 being in contact with the ground and supporting the hinge unit 21. The second support portion 23 is configured such that, when the loading plate 20 is unfolded in the direction perpendicular to the main body 10, a lower end thereof is positioned on or below a virtual straight line connecting the lower ends of the first support portion 22 and the wheel unit 11 when viewed from the side.

In the folding handcart 100 according to the second embodiment of the present invention, a main body support portion 14 is provided at the lower portion of the main body 10, the main body support portion 14 being in contact with the ground and supporting the main body 10. The main body support portion 14 is configured such that, when the loading plate 20 is unfolded in the direction perpendicular to the main body 10, a lower end thereof is positioned on or below a virtual straight line connecting the lower ends of the first support portion 22 and the wheel unit 11 when viewed from the side.

Furthermore, referring to FIG. 7, the folding handcart 100 according to the third embodiment of the present invention includes the first support portion 22, the second support portion 23, and the main body support portion 14. The support portions are configured such that, when the loading plate 20 is unfolded in the direction perpendicular to the main body 10, lower ends of the second support portion 23 and the main body support portion 14 are positioned on or below a virtual straight line connecting the lower ends of the first support portion 22 and the wheel unit 11 when viewed from the side.

As described above, in the folding handcart 100 according to the first, second, or third embodiment of the present invention, when the loading plate 20 is unfolded in the direction perpendicular to the main body 10, the lower end of the second support portion 23 or the lower end of the main body support portion 14 may be positioned on or below a virtual straight line connecting the lower ends of the first support portion 22 and the wheel unit 11 when viewed from the side. Therefore, it is possible to prevent the loading plate 20 from being folded toward the main body 10 due to load of an article or the folding box 200 loaded on the loading plate 20 such that an article or the folding box 200 can be stably loaded on the loading plate 20.

Referring to FIG. 9, when the loading plate 20 is folded and the folding handcart 100 is in a stopped state, the lower end of the wheel unit 11 and the lower end of the main body support portion 14 or the lower end of the hinge unit 21 are in contact with the ground such that the main body 10 and the loading plate 20 are supported thereby and thus the folding handcart 100 can be stood upright. In other words, the lower ends of the wheel unit 11 and the main body support portion 14 or the lower ends of the wheel unit 11 and the hinge unit 21 are brought into contact with the ground, or all of the lower ends of the wheel unit 11, the main body support portion 14, and the hinge unit 21 are brought into contact with the ground, whereby the main body 10 and the loading plate 20 are supported thereby and thus the folding handcart 100 can be stood upright.

In addition, the folding handcart 100 according to the embodiment of the present invention may be configured such that the main body 10 is provided with a handle 30 to be held by a user. Here, the handle 30 may be inserted into a handle insertion recess 17 and connected to the main body 10. Here, the handle 30 may be configured to be adjustable in length such that convenience in use can be improved.

Although the invention is described with reference to specific items such as specific structural elements, to merely some embodiments, and to drawings, such specific details disclosed herein are merely representative for purposes of helping more comprehensive understanding of the present invention. The present invention, however, is not limited to only the example embodiments set forth herein, and those skilled in the art will appreciate that the present invention can be embodied in many alternate forms. Accordingly, the present invention is intended to cover not only the exemplary embodiments, but also various alternatives, modifications, equivalents and other embodiments that may be included within the spirit and scope of the present invention as defined by the appended claims.

We claim:

1. A folding handcart comprising:
   a main body having at least one wheel unit at a lower portion thereof, said main body having a supporter extending horizontally from the lower portion thereof;
   a loading plate connected by a hinge unit to the supporter of said main body, said loading plate being foldable toward said main body by a rotation about the hinge unit, said loading plate adapted to stow a folded box thereon in a predetermined stowage space between said main body and said loading plate in accordance with an area of the supporter; and
   a spring unit positioned on the lower portion of said main body so as to provide an elastic force in a downward direction, wherein the hinge unit has a hinge step that transfers the elastic force of said spring unit to the hinge unit, when the hinge unit is folded toward the main body, said spring unit comprising:
      a spring cooperative with the hinge unit so as to provide the elastic force to the hinge step; and
      a spring case receiving said spring therein and being inserted into a spring case insertion recess at the lower portion of said main body.

2. The folding handcart of claim 1, further comprising:
   a connecting part affixed to an upper portion of the main body, said connecting part adapted to hold the folded box on an upper surface of the supporter.

3. The folding handcart of claim 1, wherein a first support portion is on a first side of said loading plate, wherein the first support portion supports said loading plate.

4. A folding handcart comprising:
   a main body having at least one wheel unit at a lower portion thereof, said main body having a supporter extending horizontally from the lower portion thereof; and
   a loading plate connected by a hinge unit to the supporter of said main body, said loading plate being foldable toward said main body by a rotation about the hinge unit, said loading plate adapted to stow a folded box thereon in a predetermined stowage space between said main body and said loading plate in accordance with an area of the supporter, wherein a first support portion is on a first side of said loading plate, said first support portion supporting said loading plate when the first support portion contacts an underlying surface, wherein a second support portion is on a second side of said loading plate, said second support portion supporting the hinge unit when the second support portion contacts the underlying surface, wherein when said loading plate is unfolded in a direction perpendicular to said main body, a lower end of said second support portion is positioned on or below a virtual straight line connecting lower ends of the first support portion and the at least one wheel unit.

5. A folding handcart comprising:
   a main body having at least one wheel unit at a lower portion thereof, said main body having a supporter extending horizontally from the lower portion thereof; and
   a loading plate connected by a hinge unit to the supporter of said main body, said loading plate being foldable toward said main body by a rotation about the hinge unit, said loading plate adapted to stow a folded box thereon in a predetermined stowage space between said main body and said loading plate in accordance with an area of the supporter, wherein a first support portion is on a first side of said loading plate, said first support portion supporting said loading plate when the first support portion contacts an underlying surface, wherein a main body support portion is on the lower portion of said main body, said main body support portion supporting said main body when said main body support portion contacts the underlying surface, wherein when said loading plate is unfolded in a direction perpendicular to said main body, a lower end of the main body support portion is positioned on or below a virtual straight line connecting lower ends of the first support portion and the at least one wheel unit.

6. The folding handcart of claim 5, wherein a lower end of the at least one wheel unit and the lower end of the main body support portion or a lower end of the hinge unit contacts an underlying surface so as to support said main body and said loading plate when said loading plate is folded.

* * * * *